United States Patent [19]

Evans

[11] 3,822,799
[45] July 9, 1974

[54] METHOD OF PRODUCING BLAST FURNACE SLAG PRODUCTS
[75] Inventor: Raymond H. Evans, Yardley, Pa.
[73] Assignee: The Calumite Company, Trenton, N.J.
[22] Filed: Jan. 7, 1972
[21] Appl. No.: 216,000

[52] U.S. Cl............ 214/152, 65/19, 106/51, 106/117, 198/36, 214/10.5, 241/29
[51] Int. Cl. ..... B65g 3/02, B65g 65/28, C03c 13/00
[58] Field of Search ............... 106/51, 40 V; 65/19; 148/36; 214/10.5, 152; 241/29

[56] References Cited
UNITED STATES PATENTS
2,750,023   6/1956   Meissner.............................. 198/36
3,148,044   9/1964   Forschepiepe........................ 65/19
3,567,413   3/1971   Miller................................... 65/19

FOREIGN PATENTS OR APPLICATIONS
1,516,836   2/1968   France

OTHER PUBLICATIONS
Nat'l Slag Ass'n Symposium, 1–19, Symp. 6, "Preparation of Slag for the Market", pp. 16–17, March 1928, TN707N277

Primary Examiner—Helen M. McCarthy
Attorney, Agent, or Firm—Sperry and Zoda

[57] ABSTRACT

A blast furnace slag product adapted for use in the manufacture of glass is produced by depositing successive loads of slag each having a composition within a predetermined range, in spaced locations within a storage area so as to produce a layer composed of numerous individual loads each differing more or less in composition within said range. Several such layers are arranged one upon another after which the material required for use is removed from the storage area in a direction transverse to said layers and the material thus removed is ground and subjected to magnetic separation whreby a product of highly uniform composition is obtained.

5 Claims, 7 Drawing Figures

PATENTED JUL 9 1974 3,822,799

METHOD OF PRODUCING BLAST FURNACE SLAG PRODUCTS

FIELD OF INVENTION

It has been suggested heretofore that blast furnace slag be used in the manufacture of glass as exemplified by U. S. Reissue Pat. No. 26,328. However, the composition of the blast furnace slag used for this purpose must be very critically controlled since variations amounting to no more than a fraction of one per cent in the composition of the ingredients being used in the manufacture of glass may have a controlling influence on the color, quality and properties of the glass produced. On the other hand the composition of blast furnace slag itself varies considerably depending upon the composition of the iron ore, coke, and fluxing agents charged into the blast furnace, the conditions of operation of the furnace, and other factors which vary with each blast furnace and from day to day even in the same furnace. As a result it is not possible to use blast furnace slag as produced in significant amounts in the commercial manufacture of glass.

While attempts have been made to mix or blend different blast furnace slags to produce an acceptable and usable product for glass manufacture, the continued variation in composition of the slag has made it extremely difficult to attain the uniformity in product composition required for consistent and large scale usage of blast furnace slag in glass manufacture.

In accordance with the present invention blast furnace slag products are produced which are of such uniform and consistent composition as to permit them to be used in the continuous commercial manufacture of glass and to be employed in larger amounts than has heretofore been possible. These results are attained by selecting those blast furnace slags or portions thereof which have a composition falling within a predetermined wide range of compositions. Loads of the slags thus selected are then deposited in several spaced locations within a large storage area after which other loads of selected slag obtained at other times or from other sources are placed in other spaced locations within the storage area. The depositing of loads of slag in this manner is continued until the whole storage area has been covered with a layer of slag composed of numerous loads which may differ considerably in composition from that of other loads adjacent thereto.

Thereafter other loads of selected slags are deposited in the storage area in a similar way and in additional horizontal layers until a large store consisting of from three to eight or ten layers has been produced wherein no single load in the store may have the same composition as that of other loads adjacent thereto or in a layer above or below the same in the entire store.

After the store of slag has thus been produced a power shovel or other means is used to remove slag from the store in a vertical direction or transverse to the horizontal layers whereby the slag thus removed from the store consists of a complete mixture of different slags, all of which have a composition falling within a predetermined overall range but none of which are necessarily the same.

The mixed slags removed from storage are then ground together and so blended as to obtain a finished slag product which is of known and highly uniform composition. Moreover, by producing a large supply of slag in the manner described it is possible to provide the glass manufacturer with a slag product of consistent and uniform composition and in an amount which permits commercial manufacture of glass as a continuing operation without making daily or hourly changes in the mixture of other glass making ingredients to compensate for differences in the composition of the slag product being used.

THE DRAWINGS

PREFERRED EMBODIMENTS

In that embodiment of the invention chosen for purposes of illustration, the blast furnace slags to be used may be obtained from various blast furnaces and from various locations. The slags may be obtained from pits in which the slags have been air cooled, or the slags may be in the form of "clinker" produced by dumping the slag into a body of water, or the slag may be of the expanded type produced by subjecting the molten slag to the action of a spray of water as it is poured from a ladle into a pit.

In any event the slag to be used is analyzed and is selected from those slags or portions of the slag having a composition within a predetermined overall range. The range in composition of the slags selected for use is preferably as follows:

| | |
|---|---|
| $SiO_2$ | 20% – 50% |
| $Al_2O_3 + TiO_2$ | 2% – 30% |
| CaO | 15% – 65% |
| MgO | 0% – 26% |
| $Fe_2O_3$ | 0.1% – 5.0% |
| MnO | 0% – 13.0% |
| $Na_2O + K_2O$ | 0% – 5.0% |
| $SO_3$ | 0% – 3.0% |
| S= | 0% – 3.0% |
| Free iron + magnetisable material | 0.7% |

In order to facilitate the selection of slags having a composition within the foregoing range, it is usual to obtain from the blast furnace operator a "charge sheet" setting forth the amounts and character of the iron ore, coke, limestone and other raw materials charged into the furnace as well as a statement indicating the history of operation of the furnace during the time the slag is being produced. A daily analysis of the slag as determined by the steel mill is also obtained to aid in the selection of the slags to be used and to give advance notice of any significant changes in slag composition to be anticipated.

The information obtained from the "charge sheet" and slag analysis will enable the user to determine whether any changes in the slag are temporary or permanent and whether any part of all of the slag produced in any blast furnace should be accepted or rejected. The slags are also inspected to avoid the inclusion of foreign matter such as fire-brick, scrap steel, unburned coke, limestone or the like. Ordinarily only about 25% of the total amount of slag discharged from a blast furnace is found to be suitable for use in the practice of the present invention.

The slags found to be acceptable in this manner are removed from the collecting pit and subjected to a crushing and sizing operation to obtain a product consisting of pieces of slag ranging in size from about ¼ inch to 3 or 4 inches, most of which are preferably of about a 2 inch size. The slag thus prepared may further be passed over a magnetic separator to remove at least a part of any free iron or magnetizable material present in the slag.

Figure 1:
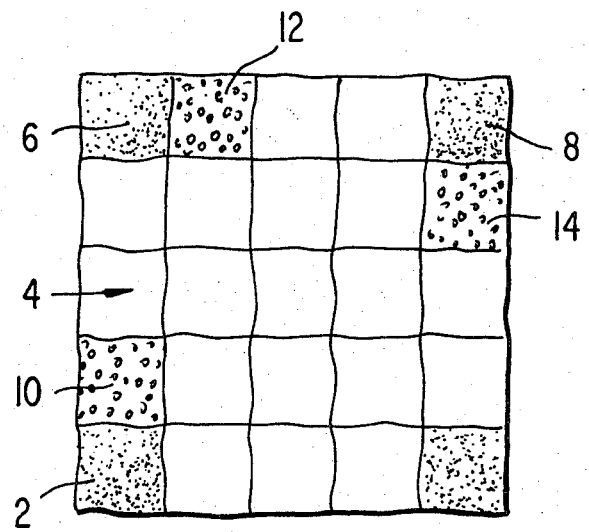
FIG. 1 is a typical plan which may be used in depositing loads of blast furnace slag in forming any individual layer of slag deposited in a storage area in accordance with the present invention.

The slag selected and thus prepared for use is transported to a storage area and as shown in FIG. 1 the successive loads of slag are deposited in spaced locations within the storage area. Thus, the first load or charge of slag may be deposited at 2 in the storage area 4, the second charge is deposited at 6, the third load at 8, and so on until all of the slag selected and prepared for use in a single day or from a single discharge of slag from a furnace has been placed in spaced locations in the storage area. Thereafter, other loads of slag selected on other days or at other times or from other sources are deposited at other spaced locations in the storage area as represented at 10, 12, 14, etc., for example.

In this way the loads of slag are deposited in the storage area in a generally checker-board arrangement and such a manner that the loads of slag which are obtained on one day or which are essentially of the same composition are each positioned within the storage area in locations adjacent to or surrounded by other loads of different slags which are obtained at other times or from other sources and differ at least somewhat in composition while being within the accepted overall range of compositions.

The larger the storage area the more piles of slag are required to cover the area but in a typical operation wherein the storage area occupies four acres, about 160 loads of slag may be required to cover the area. In order to attain the desired uniformity in the final product it is generally necessary to lay down at least 15 or 20 loads in forming each layer of slag. Thereafter, the piles are smoothed out to form a first horizontal layer of substantially uniform thickness presenting a flat upper surface. The amount of slag making up the layer is then recorded and samples of the slag in the layer are taken from numerous spaced points, say 50 or so points, throughout the layer, care being taken to obtain samples of the same weight. These samples are then mixed thoroughly and the mixture analyzed to establish the average composition of the slags making up that layer and as indicated for layer 1 in each of FIGS. 4 to 7 of the drawings.

Figure 2:
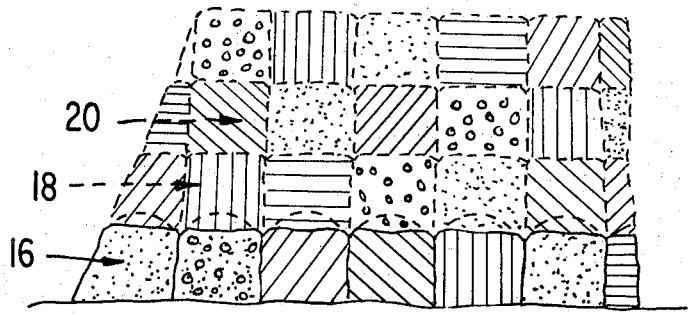
FIG. 2 is a diagrammatic illustration indicating the manner in which layers of different slags are produced and arranged in a storage area.
Figure 3:
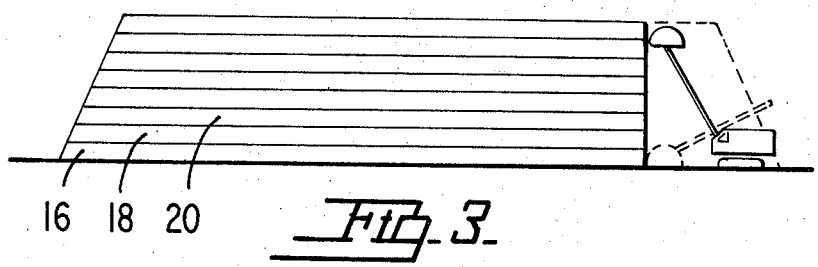
FIG. 3 is a diagrammatic illustration showing the manner in which slags may be removed from the storage area for use.

After the first layer 16 has been prepared as described, other loads of slag are deposited on the first layer and formed into superimposed layers in the same way as represented at 18, 20, etc., in FIG. 2. The average composition of each of the superimposed layers is determined in a similar way as indicated in FIGS. 4 to 7. At least three and preferably eight or ten layers of slag are placed one upon another to establish a store of slags suitable for use in producing a uniform product in accordance with the present invention. Thus the store of slag produced may contain a total of from about 30,000 to 50,000 tons of slag.

The larger the storage area the more piles of slag are required to produce each layer and the longer it will take to produce the complete store of slag comprising numerous layers. Thus it may take 3 or 4 months to prepare such a store of slag during which time the slag is exposed to the weather and each layer of slag may be exposed to air and rain for a week or two before it is covered by the next layer. As a result at least a portion of the sulfides contained in the slag may be converted to sulfates and a slag initially containing 0.9 percent of sulfides may be modified to contain 0.8 percent of sulfates. Any free iron present will also tend to oxidize during the weathering of the slag.

The total stored supply of slag thus produced will be composed of a multitude of individual loads of slag varying more or less in composition from any other load adjacent thereto in either the same layer or in any other layer above or below the same. Moreover each individual load constitutes only a relatively small part of the total amount of slag deposited on the storage area. The stored slag when required for use is removed from the deposit by means of a power shovel, front end loader, or the like working from one side of the deposit and removing the slag vertically or transversely with respect to the horizontal layers whereby the slag withdrawn will contain portions of numerous loads of the slag used in forming the deposit. Thus any shovelful or sample removed from the stored deposit may in fact contain 10, 20 or perhaps 30 different slags used in establishing the stock of slag in the deposit.

The material withdrawn is further treated for use and for this purpose is preferably heated to a temperature of about 250° to 300° F to remove moisture and is ground or pulverized to a particle size such that 95 percent will pass a U.S. Standard sieve series 16 mesh and not more than 50 percent of the particles will pass a 100 mesh screen. The material further is subjected to intense and repeated magnetic separation to remove free iron and other magnetizable materials until the product contains not more than 0.7 percent by weight of free iron and other magnetizable materials. During this operation some carbon associated with the iron may also be removed from the slag.

In practice it is usual to build a second store of slag composed of multiple layers as described above while removing slag from a previously prepared store for treatment and shipment so that a continuous supply of such slags will be available for treatment and shipment.

Figure 4:
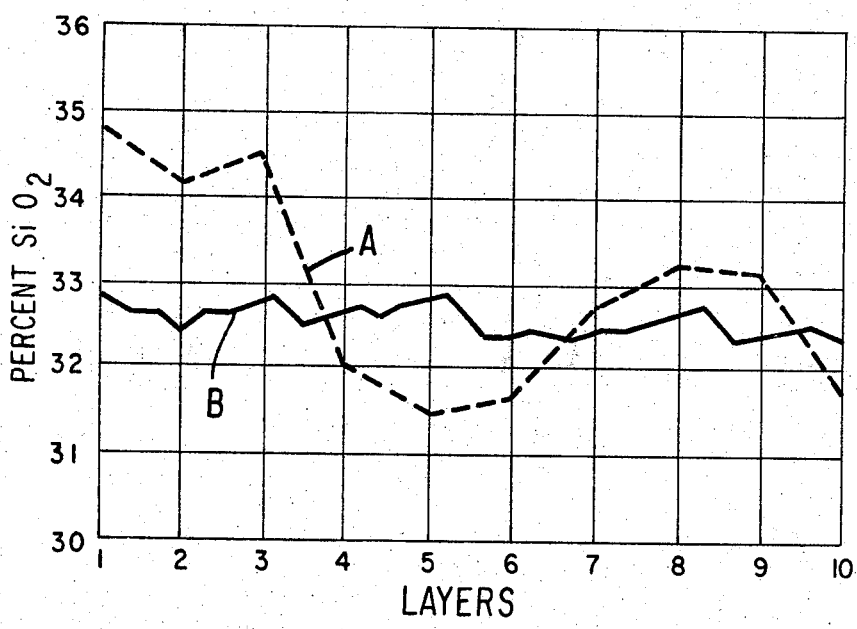
FIGS. 4 to 7 are graphs illustrating the variations in composition of slags used in the practice of the present invention.
Figure 5:
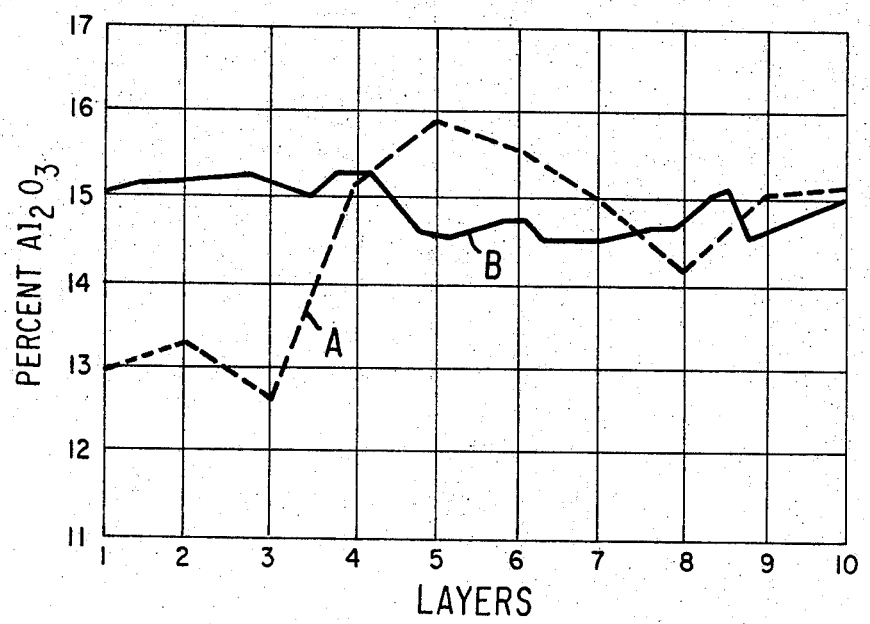
Figure 6:
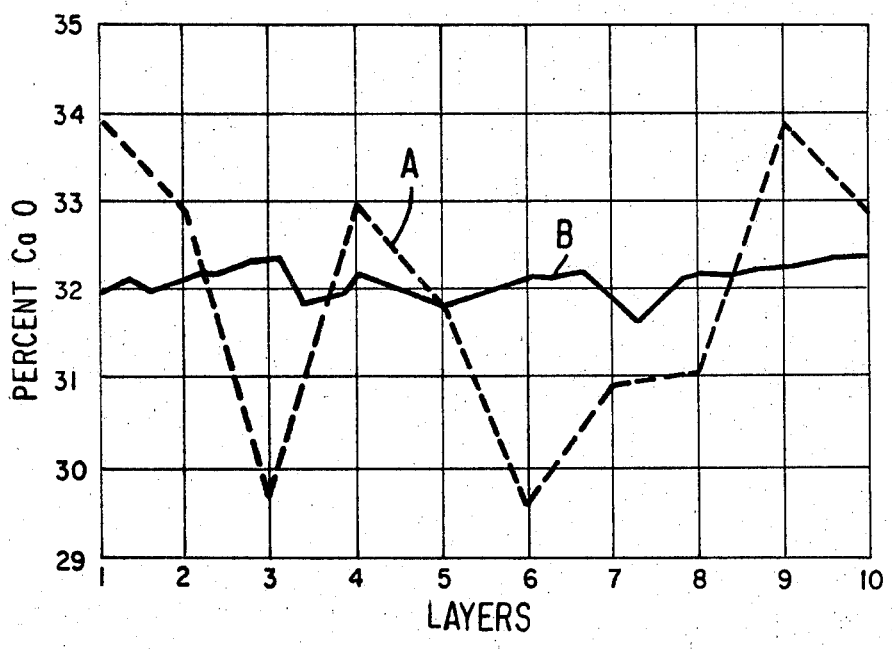
Figure 7:
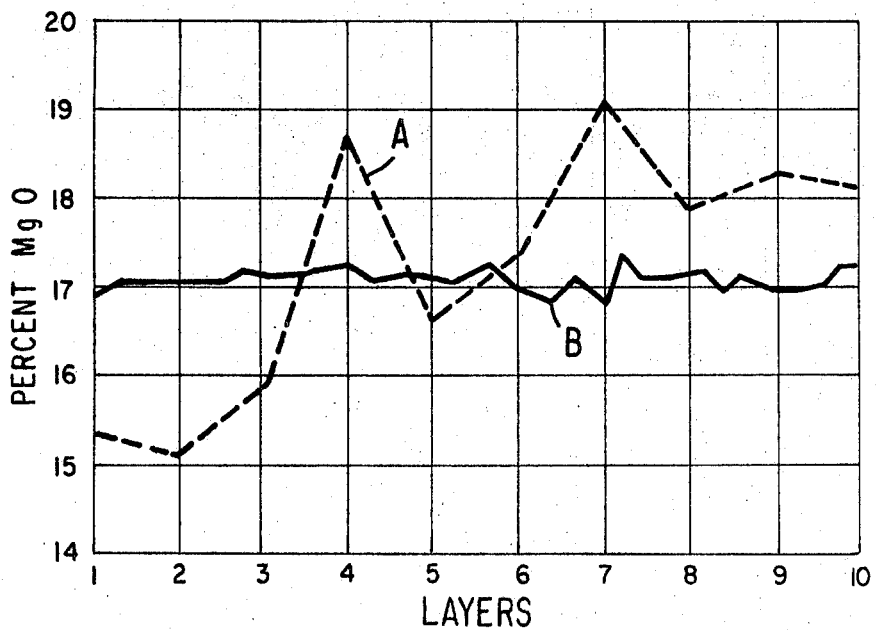

The slag product as prepared and shipped to a glass manufacturer is found to possess remarkable uniformity in composition. Thus as shown in FIG. 4 the amount of $SiO_2$ contained in each layer of the slag in a ten layer store thereof as determined by analysis of each layer in accordance with the procedure described above, is represented by the dotted line A whereas the amount of $SiO_2$ in the finished product as analyzed upon shipment is indicated by the line B in FIG. 4. The amount of $Al_2O_3$ in each layer is similarly represented by the dotted line A of FIG. 5 while the $Al_2O_3$ content of the finished product determined by analysis of each shipment is represented by line B. The CaO analysis of the layers and finished product are shown in the same way in FIG. 6 and the MgO content of the layers and finished product are represented by the lines A and B respectively of FIG. 7.

Since the thickness of each layer and the amount of slag contained in each layer of the stored material is known as well as the composition of the slag in each layer, the composition of the finished product is readily determined and its suitability for use in any particular glass making operation is readily apparent to the glass manufacturer.

The composition of any particular sample of the product thus obtained will, of course, depend upon the amount and composition of the slags which were selected and blended to produce that particular lot of the slags to be treated. However, the selection and proportioning of the slags are controlled in every case so as to obtain an end product which is of such definite, known, and uniform composition that the amount of each of the major oxides ($SiO_2$, $Al_2O_3$, $CaO$, and $MgO$) in any sample taken from the slag product does not vary by more than about $\pm$ 0.3 percent, the amount of iron oxide ($Fe_2O_3$) does not vary by more than about $\pm$ 0.04 percent, the amount of manganese oxide does not vary by more than about $\pm$ 0.05 percent, and the amount of each of the other or minor oxides therein ($Na_2O$ and $K_2O$) does not vary by more than about $\pm$ 0.02 percent whereas the amount of $SO_3$ and sulfide sulfur does not vary by more than about $\pm$ 0.10 percent.

Typical end products thus obtained may have the following compositions:

|  | Example I | Example II | Example III | Example IV |
|---|---|---|---|---|
| $SiO_2$ | 38.80 | 37.85 | 32.35 | 38.45 |
| $Al_2O_3$ + $TiO_2$ | 9.75 | 7.10 | 14.80 | 11.10 |
| CaO | 40.60 | 38.35 | 33.00 | 44.15 |
| MgO | 8.20 | 14.20 | 17.00 | 2.50 |
| $Fe_2O_3$ | 0.25 | 0.30 | 0.27 | 0.25 |
| MnO | 0.50 | 0.35 | 0.15 | 0.62 |
| $Na_2O$ + $K_2O$ | 0.70 | 0.69 | 0.62 | 0.90 |
| $SO_3$ | 0.14 | 0.17 | 0.33 | 0.30 |
| S | 0.75 | 0.45 | 0.90 | 1.24 |

The specific composition of any of the products embodying the present invention which is to be used in any glass making operation can ordinarily be selected from any of the various blends or compositions falling within the said overall range. This flexibility in the composition and use of the modified blast furnace slag products of the present invention results from the known and uniform composition of each individual product as supplied to the glass manufacturer. The manufacturer can then adjust the composition of the total batch of glass making materials with complete certainty by varying the amount of any oxidizing, reducing or other agents added to the batch before it is introduced into the glass making furnace. In this way the difficulties and uncertainties incident to the use of blast furnace slag in prior glass making operations are eliminated.

The glass manufacturer is not only given the specific composition of the particular modified blast furnace slag product supplied but also is advised as to the character of the slag used in producing the product. This information is pertinent and needed in view of the fact that the composition of products manufactured from the same slag when air cooled, foamed or granulated, is found to vary as indicated in the following typical example.

EXAMPLE V

|  | Foamed | Air Cooled | Granulated |
|---|---|---|---|
| $SiO_2$ | 32.30 $\pm$ .30% | 32.17 $\pm$ .30% | 32.04 $\pm$ .30% |
| $Al_2O_3$+$TiO_2$ | 18.80 $\pm$ .30% | 18.74 $\pm$ .30% | 18.68 $\pm$ .30% |
| CaO | 41.00 $\pm$ .30% | 40.84 $\pm$ .30% | 40.68 $\pm$ .30% |
| MgO | 4.15 $\pm$ .20% | 4.13 $\pm$ .20% | 4.11 $\pm$ .20% |
| $Fe_2O_3$ | 0.26 $\pm$ .02% | 0.26 $\pm$ .02% | 0.26 $\pm$ .02% |
| MnO | 1.05 $\pm$ .05% | 1.05 $\pm$ .05% | 1.05 $\pm$ .05% |
| $Na_2O$+$K_2O$ | 1.07 $\pm$ .10% | 1.07 $\pm$ .10% | 1.07 $\pm$ .10% |
| $SO_3$ | 0.15 $\pm$ .10% | 0.12 $\pm$ .10% | 0.09 $\pm$ .10% |
| S | 0.55 $\pm$ .05% | 1.00 $\pm$ .05% | 1.40 $\pm$ .05% |

The amount of any modified blast furnace slag product of the present invention which can be used in any glass making operation can be varied over a wide range. Thus, as little as 0.5 percent of the slag product, based on the weight of the sand used in the charge, can be used or the amount may be as high as 40 percent of the charge. Even when a very limited amount of the slag product is used the amount of "seeds" in the resulting glass product is markedly reduced and the firing temperature required in melting and fining the glass is also reduced. This is believed to be due to the reducing action of the slag product which serves to aid in conversion of sulfates present in the glass melt to $SO_2$ at a stage in the melting process which permits ready release of the $SO_2$ gas produced. Of course, when larger amounts of slag products are employed the cost of producing glass is further reduced. In general the amount of slag product used in producing flint glass is less than that which may be used in producing amber or other dark colored glass.

It will of course be understood that the size and shape of any storage area and the number and arrangement of the piles or loads of slag therein as well as the number and thickness of the various layers of slag in any store thereof can be selected and varied in many ways. Similarly, the manner in which material is removed from any store of slag is capable of wide variation. In view thereof it should be understood that the embodiment of the invention and the process steps described above are intended to be illustrative only and are not intended to limit the scope of the invention.

I claim:

1. The method of storing slags by blend piling in a checkerboard arrangement and removing by transverse sections to obtain successive quantities of blast furnace slag of substantially uniform composition which comprises the steps of selecting those portions of such slags which have an analyzed composition falling within predetermined limits and which are in the form of particles ranging in size from about ¼ to 4 inches, depositing such portions of the slags in predetermined spaced locations in the storage area, successively depositing other portions of other blast furnace slags having a composition falling within said predetermined limits in other predetermined spaced locations within said storage area until the area is covered with a first horizontal layer of slag, thereafter selecting and depositing additional portions of other slags in a like manner in a layer over the slag forming said first layer, exposing each of said layers of slag to the weather for a period of at least one week so as to permit oxidation and leaching out of sulfur containing constituents thereof, and repeating said operations until at least three such superposed layers of slag have been deposited to form a blend pile wherein the various portions of slags selected and forming the blend pile are disposed in a checkerboard arrangement in both vertical and horizontal directions, and then removing successive quantities of slag from the blend pile thus produced in a direction transverse to said horizontal layers whereby each of these successive quantities of slag removed will contain parts of numerous portions of the slag making up said blend pile and having a composition which will closely approximate the average composition of all of the portions of the slags making up said blend pile.

2. The method as defined in claim 1 wherein from three to 10 layers of slag are placed one upon another before the stored slag is removed to obtain a quantity of slag to be further treated.

3. The method as defined in claim 1 wherein the slags selected for use each have a composition within the following limits:

| | |
|---|---|
| $SiO_2$ | 20% – 50% |
| $Al_2O_3 + TiO_2$ | 2% – 30% |
| CaO | 15% – 65% |
| MgO | 0% – 26% |
| $Fe_2O_3$ | 0.1% – 5.0% |
| MnO | 0% – 13.0% |
| $Na_2O + K_2O$ | 0% – 5.0% |
| $SO_3$ | 0% – 3.0% |
| S= | 0% – 3.0% |
| Free iron + Magnetizable material | 0.7% |

4. The method as defined in claim 1 wherein each layer of slag is made up of at least 15 portions of slag.

5. The method as defined in claim 1 wherein each portion of the slag in a layer thereof is surrounded by other portions of slag having a somewhat different composition within said predetermined limits.

* * * * *